(12) United States Patent
Kim et al.

(10) Patent No.: US 8,239,384 B2
(45) Date of Patent: *Aug. 7, 2012

(54) APPARATUS FOR AUTOMATICALLY SEARCHING INFORMATION AND METHOD THEREOF

(75) Inventors: Ki Won Kim, Sungnam (KR); Hyun A Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1067 days.

This patent is subject to a terminal disclaimer.

(21) Appl. No.: 10/359,114

(22) Filed: Feb. 6, 2003

(65) Prior Publication Data

US 2003/0122963 A1     Jul. 3, 2003

Related U.S. Application Data

(62) Division of application No. 09/434,512, filed on Nov. 5, 1999, now Pat. No. 6,549,905.

(30) Foreign Application Priority Data

Nov. 19, 1998 (KR) .................................. 50113/1998

(51) Int. Cl.
*G06F 7/00* (2006.01)
*G06F 17/30* (2006.01)
(52) U.S. Cl. ..................... 707/736; 707/758; 707/796
(58) Field of Classification Search .............. 707/10; 725/39, 52, 137
See application file for complete search history.

(56) References Cited

U.S. PATENT DOCUMENTS

| | | | |
|---|---|---|---|
| 4,768,144 A * | 8/1988 | Winter et al. ................. 715/255 |
| 5,661,526 A * | 8/1997 | Hamamoto et al. ........... 348/465 |
| 5,764,992 A | 6/1998 | Kullick et al. |
| 5,813,007 A | 9/1998 | Nielsen ........................... 707/10 |
| 5,898,836 A | 4/1999 | Freivald et al. ............... 709/218 |
| 5,905,866 A * | 5/1999 | Nakabayashi et al. ........ 709/223 |
| 5,978,807 A * | 11/1999 | Mano et al. ............................ 1/1 |
| 5,978,828 A * | 11/1999 | Greer et al. .................... 709/224 |
| 5,978,833 A * | 11/1999 | Pashley et al. ................. 709/200 |
| 5,991,760 A | 11/1999 | Gauvin et al. ................... 707/10 |
| 6,012,087 A * | 1/2000 | Freivald et al. ............... 709/218 |
| 6,043,849 A * | 3/2000 | Imanaka et al. ............... 348/468 |
| 6,045,048 A | 4/2000 | Wilz, Sr. et al. ......... 235/472.01 |

(Continued)

FOREIGN PATENT DOCUMENTS

JP         9-186978 A       7/1997

(Continued)

*Primary Examiner* — Usmaan Saeed
(74) *Attorney, Agent, or Firm* — McKenna Long & Aldridge LLP

(57) ABSTRACT

An apparatus for automatically searching information includes an extraction unit extracting a packet data from a broadcasting signal; an input unit for inputting searching conditions from a user; a receiving unit receiving the searching conditions; a server connection unit connecting a computer to an Internet server under the searching conditions and receiving and transmitting data of an Internet site; an interpreter judging whether the data received and extracted by the server connection unit and the extraction unit meets the searching conditions: a memory storing a content of the Internet site, its address, and time point information of when the site was previously searched by the user in a file form; an output unit transmitting the time point information and the data of the Internet site to the memory; and a microprocessor controlling operations of each element, with which various information desired by a user is searched based on pre-set searching conditions, and desired information out of various information of an Internet site or additional data on a television channel are stored in a memory according to the searching result.

26 Claims, 5 Drawing Sheets

U.S. PATENT DOCUMENTS

| | | | |
|---|---|---|---|
| 6,184,877 B1 * | 2/2001 | Dodson et al. | 725/110 |
| 6,195,692 B1 | 2/2001 | Hsu | 709/219 |
| 6,314,094 B1 | 11/2001 | Boys | 370/352 |
| 6,332,141 B2 * | 12/2001 | Gonzalez et al. | 1/1 |
| 6,502,241 B1 * | 12/2002 | Kretz et al. | 725/52 |
| 6,549,905 B1 * | 4/2003 | Kim et al. | 707/770 |
| 6,578,047 B1 * | 6/2003 | Deguchi | 1/1 |
| 6,732,369 B1 * | 5/2004 | Leftwich et al. | 725/39 |
| 6,769,019 B2 * | 7/2004 | Ferguson | 709/219 |
| 6,810,526 B1 * | 10/2004 | Menard et al. | 725/46 |

FOREIGN PATENT DOCUMENTS

| | | |
|---|---|---|
| JP | 10-69447 | 3/1998 |
| JP | 10-143418 | 5/1998 |
| JP | 10-149304 | 6/1998 |
| JP | 10-240457 | 9/1998 |

* cited by examiner

APPARATUS FOR AUTOMATICALLY SEARCHING INFORMATION AND METHOD THEREOF

This application is a Divisional of U.S. application Ser. No. 09/434,512 filed Nov. 5, 1999 now U.S. Pat. No. 6,549,905.

BACKGROUND OF THE INVENTION

1. Field of the Invention

The present invention relates to an apparatus for automatically searching information based on inputted searching conditions, and more particularly to an apparatus for automatically searching information which is capable of searching information desired by a user based on pre-set searching conditions, and storing desired information out of various information of an Internet site or additional data on a television channel in a memory according to the searching result, and to its method.

2. Background of the Related Art

Nowadays, in the so-called 'Information Age', desire and demands for information are rapidly increasing, and thus, access to the Internet compared to an information ocean to acquire necessary information or to enjoy it for amusement is becoming an indispensable part of daily life. In particular, connections to the world wide web supporting informative data of music, motion pictures, besides still images or text data are being deluged.

In addition, a teletext broadcasting that provides simultaneously and repeatedly a variety of programs by multiplexing text data and other information onto a single TV broadcasting channel provides information which includes news, weather forecasts, TV program guides, leisure-related things, sports, culture, and stock exchange information to viewers, and is expected to extend to various other fields more and more.

Acquiring information by using the Internet is done via personal computers or Internet TV, and most users use "bookmarks" or "favorites" settings that includes the addresses of Internet sites which are their frequently visited sites in using Internet, functions of which are provided by web browser software programs like Netscape Navigator or Microsoft Internet Explorer, as is known. Thus, users can use bookmarks to sequentially input addresses of the bookmarked sites as stored when they get access to the Internet, by which the time and effort required for searching desired information can be much reduced.

Nevertheless, since the Internet providing such a massive amount of information is opened to all the people around the world, searching for desired data requires considerable time and effort, and also in view that the Internet has a characteristic that information is frequently and readily updated and modified on a continual basis, so that even though an Internet site including a desired information is searched, if it is the same information as previously accessed, yet to be updated, not only is an unnecessary communication expense incurred but it results in a waste of time and energy for the efforts.

This could be a serious problem to be considered in case that there are many Internet sites to be searched or the content of each desired Internet site is voluminous.

In addition, since the users have no idea as to when the content of the Internet sites is newly updated, they need to log on the Internet to check the corresponding sites often, i.e., several times per day, causing waste of time and effort.

And, in case of using additional data on a television channel, since its information has a property of a spontaneity, immediacy and changeability, such as news information that is not predictable when and where it may happen, traffic information, stock information required based on a real-time data, sports results as desired, the users must search for such information repeatedly on a display screen like in the case of using the Internet.

In other words, since the users must watch the searching process to get the desired information, they are not able to do any other things during the searching process even if that requires a considerably long time, making it impossible for the information searching to be done in the users' absence.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, an object of the present invention is to provide a method for automatically searching information and its apparatus which is capable of reducing undesirable waste of time and energy in searching information using the Internet.

Another object of the present invention is to provide a method for automatically searching information and its apparatus which is suitable for using additional data on a television channel for users' convenience.

To achieve these and other advantages and in accordance with the purpose of the present invention, as embodied and broadly described herein, there is provided an apparatus for automatically searching information including: an extraction unit extracting a packet data from a broadcasting signal; an input unit for inputting searching conditions from a user; a receiving unit receiving the searching conditions; a server connection unit connecting a computer to an Internet server under the searching conditions and receiving and transmitting data of an Internet site; an interpreter judging whether the data received and extracted by the server connection unit and the extraction unit meets the searching conditions; a memory storing a content of the Internet site, its address, and time point information of when the site was previously searched by the user in a file form; an output unit transmitting the time point information and the data of the Internet site to the memory; and a microprocessor controlling operations of each element.

There is also provided a method for automatically searching information including the steps of: receiving searching conditions for an Internet site from a user; connecting to a desired Internet site on the bases of the searching condition; judging whether the data of the connected Internet site has been updated; and receiving and storing the data of the connected Internet site in case that the data is newly updated.

In addition, there is provided a method for automatically searching additional data such as teletext data carried on a television channel broadcasting signal including the steps of: receiving searching conditions for an additional data carried on a television channel broadcasting signal; detecting whether a received additional data meets the searching conditions; and storing the additional data when the additional data as received meets the searching conditions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a schematic block diagram of an apparatus adopting a method for automatically searching information in accordance with the present invention;

FIGS. 2A and 2B are flow charts of a method for automatically searching information in accordance with one embodiment of the present invention;

FIG. 3 is a flow chart of a method for automatically searching information in accordance with another embodiment of the present invention; and FIG. 4 is a view of a vertical blanking interval (VBI) of a television signal carrying a teletext information.

DETAILED DESCRIPTION OF PREFERRED EMBODIMENTS

Reference will now be made in detail to the preferred embodiments of the present invention, examples of which are illustrated in the accompanying drawings.

Figure 1:
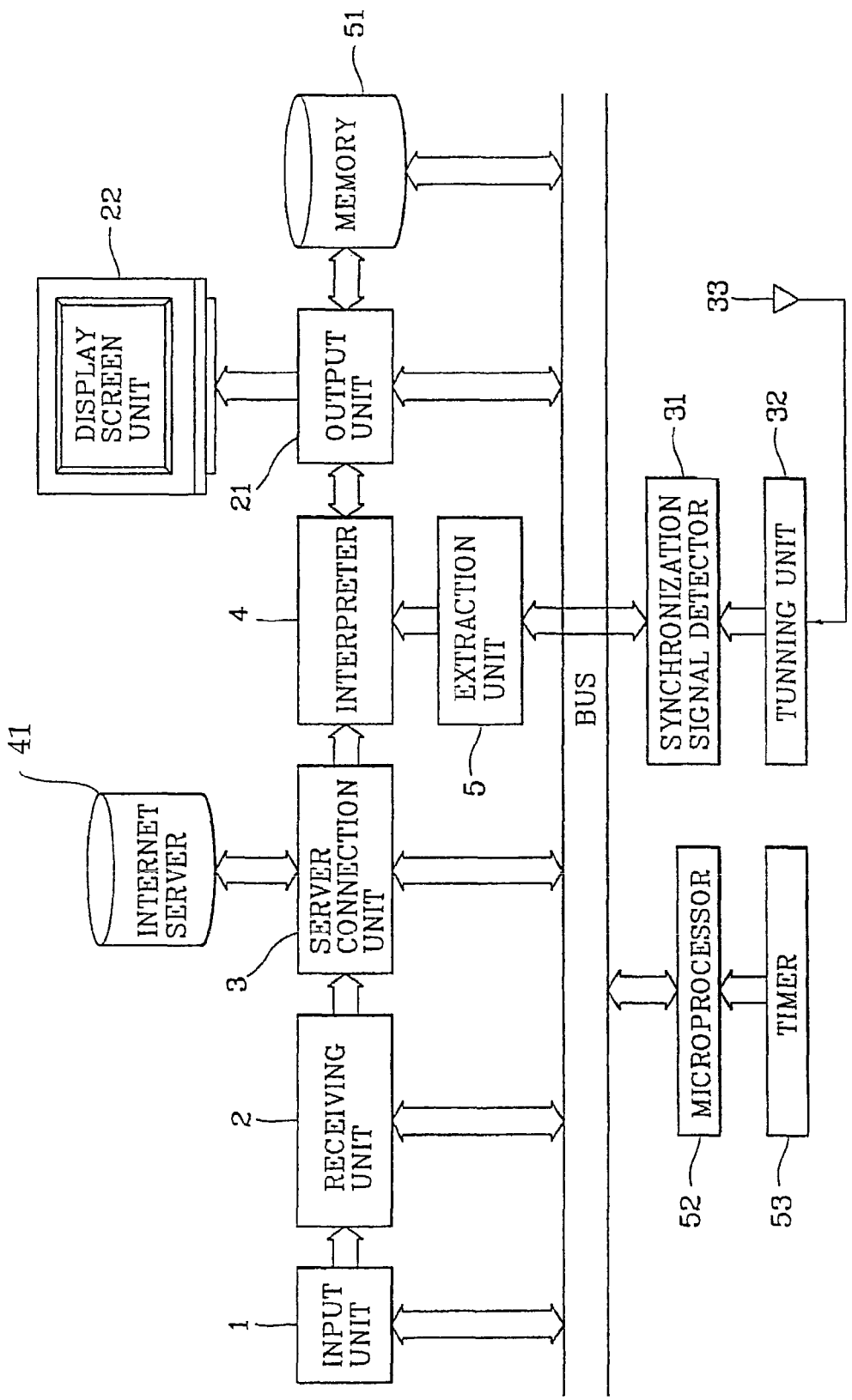

FIG. 1 is a schematic block diagram of an apparatus adopting a method for automatically searching information in accordance with the present invention, which includes a timer 53 indicating a current time; an antenna 33 receiving a broadcasting signal provided from a broadcasting station; a tuning unit 32 tuning the broadcasting signal inputted through the antennas 33 in a corresponding frequency band of a specific channel; a synchronous signal detector 31 detecting a vertical synchronization signal from the tuned broadcasting signal; an extraction unit 5 extracting a packet data designated by the detected vertical synchronization signal; an input unit 1 inputting searching conditions by a user (i.e., an address of Internet site, a key word or a searching time, etc.) from a user; a receiving unit 2 receiving the searching conditions inputted from the input unit 1; a server connection unit 3 connecting a computer to an internet server 41 in accordance with the searching conditions and receiving and transmitting data of an Internet site; an interpreter 4 judging whether the data inputted by the server connection unit 3 and the extraction unit 5 meets the searching conditions; a memory 51 storing a content of the Internet site, its address, and a time point information of a previous search by the user in a file form; an output unit 21 for outputting the result as judged by the interpreter 4 to a display screen unit 22 and transmitting the time point information and the data of the Internet site to the memory 51; and a microprocessor controlling operations of each element via a bus line.

The input unit 1 may include a keyboard of a personal computer, a remote-controller of a TV set, or an OSD (on screen display) display unit, by which a user inputs searching conditions.

In case of searching an Internet site, the searching conditions would be addresses of the sites to be searched, a domain name (referred to as a position information hereinafter), or a desired searching time point, while, in case of searching additional data on a TV channel, searching conditions would be a keyword and a searching time point. The searching time point may be set on a periodical basis by days or weeks.

The searching conditions are all stored in an internal memory (not shown) of the microprocessor 52, and the internal memory is made of a non-volatile memory so that the searching conditions may not be lost even though the power is turned off. Having an infrared receiver function, the receiving unit 2 receives and processes the searching conditions inputted by a remote-controller.

The microprocessor 52 judges whether the current time is identical to the searching time as inputted by the user, in a manner that it calculates the current time, that is, a total lapse of time from a time lapse signal periodically provided from the timer 53 and compares the calculated current time with a searching reservation time stored at the internal memory.

If the current time reaches the reserved searching time, connection is made to the Internet to search the designated site and the content of the site is stored as follows:

When the current time reaches the reserved searching time, the microprocessor 52 attempts connection to the internet server 41 providing an Internet service by means of the server connection unit 3 and confirms the connection by the server connection unit 3, and, if the connection is not made it keeps attempting connection repeatedly until the connection is made successfully.

When the connection to the Internet server is successfully made, the microprocessor 52 reads a position information of the Internet site designated as a searching condition from the internal memory, and the position information is transmitted to the Internet server 41 through the server connection unit 3 for connecting to the designated site.

When the connection is made to the desired Internet site, the content data of the corresponding site is received by the interpreter 4 through the server connection unit 3. The interpreter 4 extracts a time point information (referred to as a first time point information) when the content of the Internet site was generated from the received content data under the control of the microprocessor 52 and reads a time point information (referred to as a second time point information hereinafter) corresponding to the addresses of the various sites already stored in the memory 51 and the time point information corresponding to the addresses. The microprocessor 52 compares the addresses as read with those of the Internet sites as connected. Upon comparison, if the connected Internet site is not a stored one in the memory, the microprocessor 52 judges that the connected site is first designated as a searching-object site, and then stores the address of the connected site, the time point information, and the content of the site in the memory 51 in a file form through the output unit 21.

Meanwhile, upon comparison of the site addresses, if the connected Internet site is a stored one, the microprocessor 52 compares the first time point information corresponding to the connected Internet site with the second time point information. Upon such comparison, if the first time point information is later than the second time point information, the microprocessor judges that the content of the corresponding Internet site has been updated. If the content data has been updated, the microprocessor 52 stores the address of the site, the time point information, and the content data of the site in a file form in the memory 51 through the output unit 21. And at the same time, the output unit 21 outputs a message, for example, 'the information of the designated Internet site has been updated', for informing the user that the data has been updated to the display screen unit 22 under the control of the microprocessor 52.

By doing those operations as described above, the Internet site is automatically searched according to the inputted searching conditions.

The method for automatically searching information will now be described with reference to FIGS. 2A and 2B.

Figure 2A:
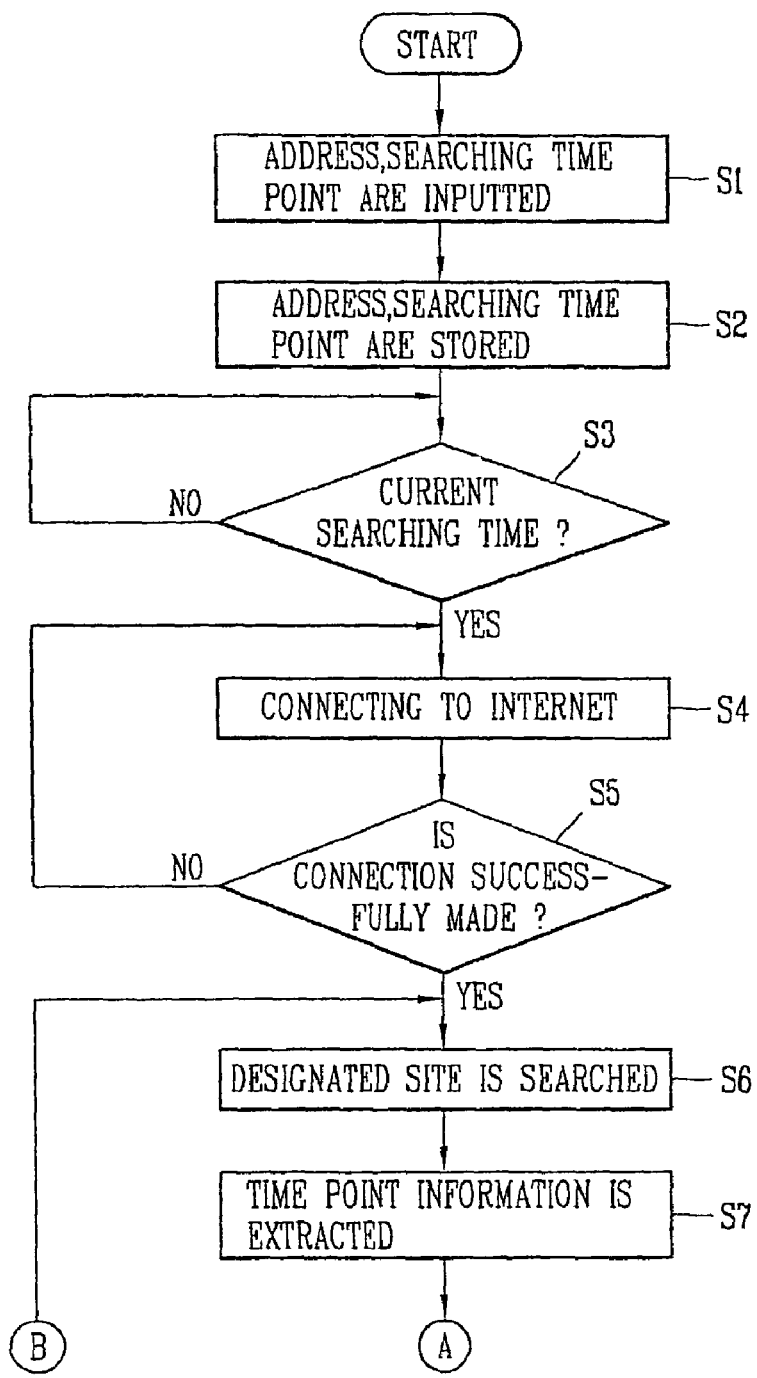
Figure 2B:
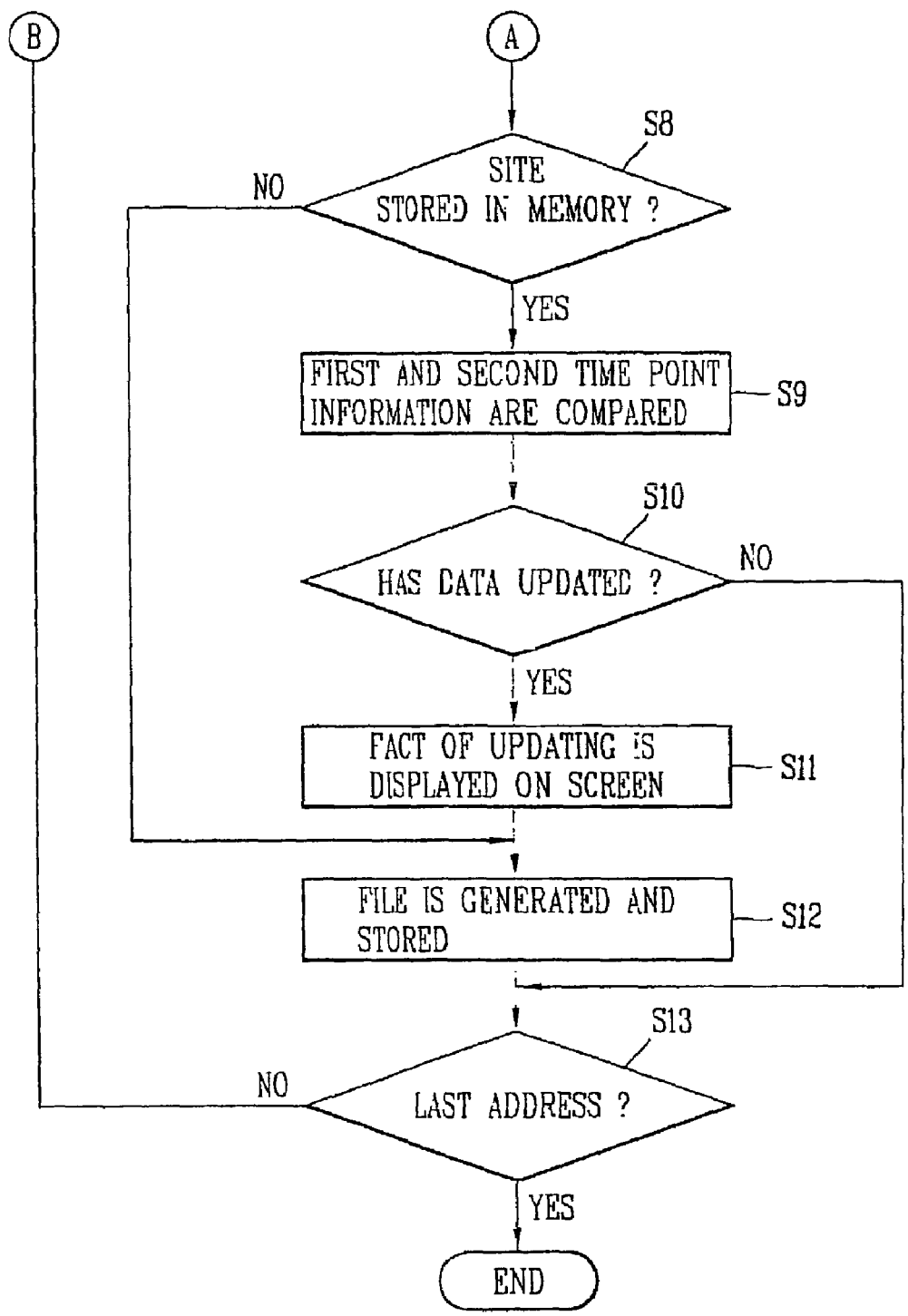

FIGS. 2A and 2B are flow charts of the method for automatically searching information in accordance with one embodiment of the present invention.

First, the case that the user sets a searching time so that plural position information are to be searched simultaneously will now be explained.

The user inputs a desired position information and a time point for searching through the input unit 1 in a step S1. The position information and the searching time point are stored in the internal memory (not shown) by the microprocessor 52 in a step S2.

The microprocessor 52 judges whether the current time is identical to the reserved searching time as was previously inputted by the user, in a manner that it calculates the current time, that is, a total lapse of time from a time lapse signal periodically provided from, the timer 53 and compares the calculated current time with the reserved searching time stored in the internal memory in a step S3.

If the current time has reached the reserved searching time, connection is made to the Internet to search the designated site and the content of the site is retrieved and stored as follows.

When the current time reaches the reserved searching time, the microprocessor 52 attempts connection to the internet server 41 providing an internet service by means of the server connection unit 3 and confirms the connection by the server connection unit 3, and if the connection is not made in steps S4-S5, it keeps attempting connection repeatedly until the connection is successfully made.

If the connection to the Internet server is successfully made, the microprocessor 52 reads a position information of the Internet site designated as a searching condition from the internal memory, and the position information is transmitted to the internet server 41 through the server connection unit 3 for connecting to the designated site. When the connection is made to the desired Internet site, the data of the corresponding site is received by the interpreter 4 through the server connection unit 3 in a step S6.

The interpreter 4 extracts a first time point information when the content of the Internet site was generated from the received data under the control of the microprocessor 52 in a step S7.

Thereafter, the microprocessor 52 judges whether the connected site is one of the sites stored in the memory 51 in a step S8. If the connected site is one of the sites stored in the memory 51, the microprocessor 52 reads the first time point information and the second time point information of the previous connection to that site stored in the memory 51 to compare them in a step S9.

Upon such comparison, if the first time point information is later than the second time point information, the microprocessor 52 judges that the data in currently being received is an updated data in a step S10, and the output unit 21 outputs a message, for example, 'the information of the designated Internet site has been updated', for informing the user that the data has been updated to the display screen unit 22 according to the command of the microprocessor 52 in a step S11.

And, at the same time, the microprocessor 52 updates the data being received through the interpreter 4 and stores it in the file of the corresponding formerly received data from the site in a step S12.

If the connected site is not one stored in the memory 51, the microprocessor 52 stores the data being received through the interpreter 4 in a new file in a step S12.

By performing the above described operations, automatic searching and updating of information on the position information of the first Internet site are performed.

Next, the microprocessor 52 judges whether there is any more position information designated as a searching condition in the internal memory in a step S13, and if there is further position information, it reads a position information of the next site and transmits an address of the site to the Internet server 41 to change the site connection in the step S4. The microprocessor 52 sequentially performs the operations of searching data received from the changed site, confirming whether it has been updated, updating the data, and storing it in steps S5-S12 in the same manner as described above. Thereafter, when the microprocessor 52 confirms that the position information of the currently connected site is the last position information stored in the internal memory in a step S13, the connection is logged off.

Meanwhile, unlike the above case where the reserved searching time inputted as a searching condition is the same for the plural position information, the case that the reserved searching times for the plural position information as inputted are designated differently will now be described.

When the current time reaches a reserved searching time, only the corresponding Internet site related to the reached searching time is searched, and data is stored according to whether or not the data of the searched Internet site has been updated in the steps S4-S12.

A method for automatically searching additional data on a television channel, and its apparatus will now be described with reference to FIGS. 1 and 3.

Figure 3:
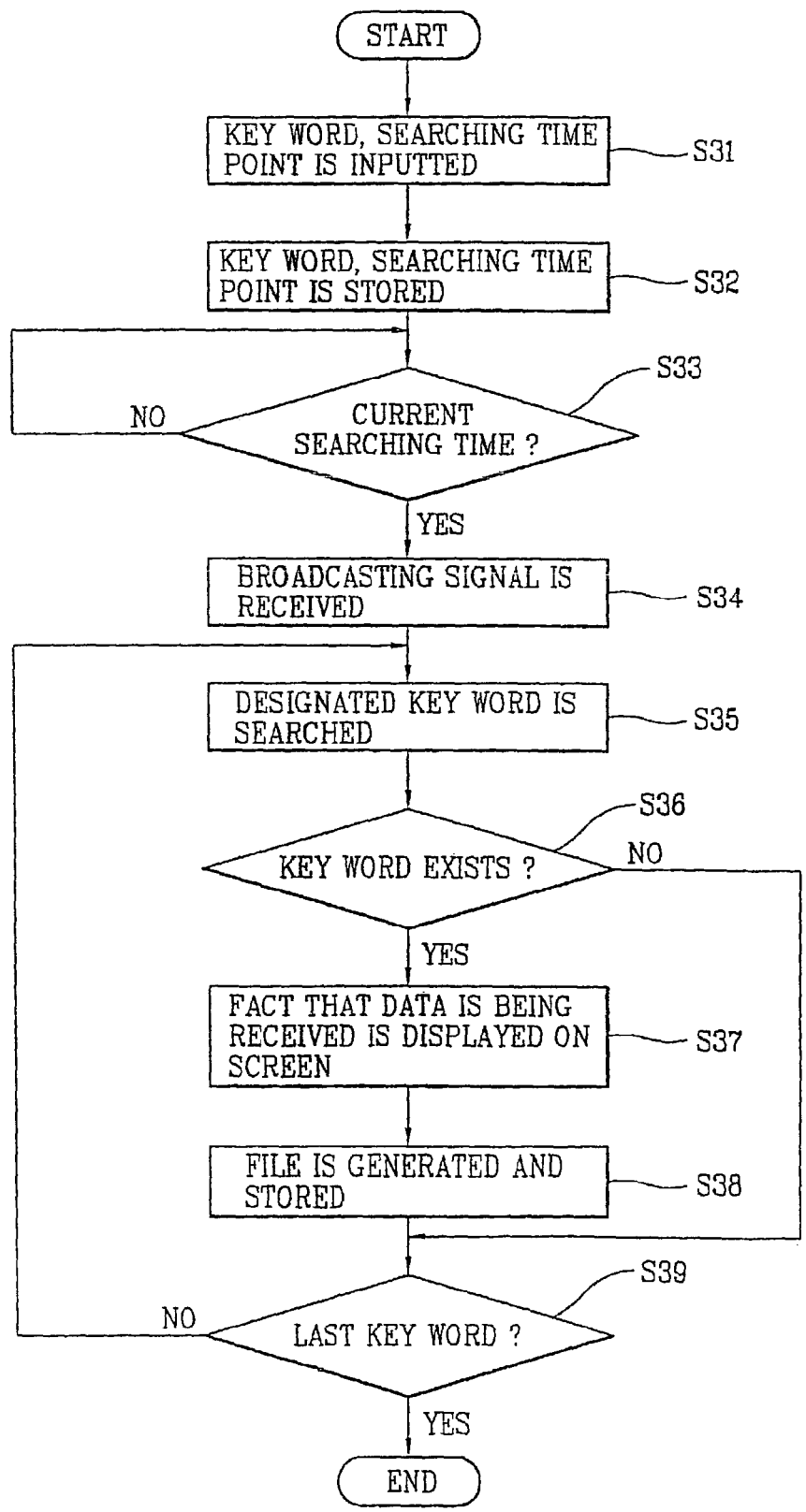

FIG. 3 is a flow chart of a method for automatically searching additional data on a television channel in accordance with the present invention.

First, a user inputs a desired key word (i.e., stocks, traffic, weather, home shopping, etc.) via the input unit 1, and at this time, a time reserved for searching the data content corresponding to the inputted key word is also inputted in a step S31. The inputted key word and the reserved searching time are stored in an internal memory (not shown) of the microprocessor 52 in a step S32.

As described above with reference to FIGS. 2A and 2B, the microprocessor 52 compares the current time with the reserved searching time stored in the internal memory. If the current time has reached the reserved searching time in a step S33, the tuning unit 32 tunes an inputted broadcasting signal and a pre-set channel information to be identical upon receipt of the broadcasting signal from the antenna 33 in a step S34, and the synchronization signal detector 31 detects a vertical synchronization pulse.

Figure 4:
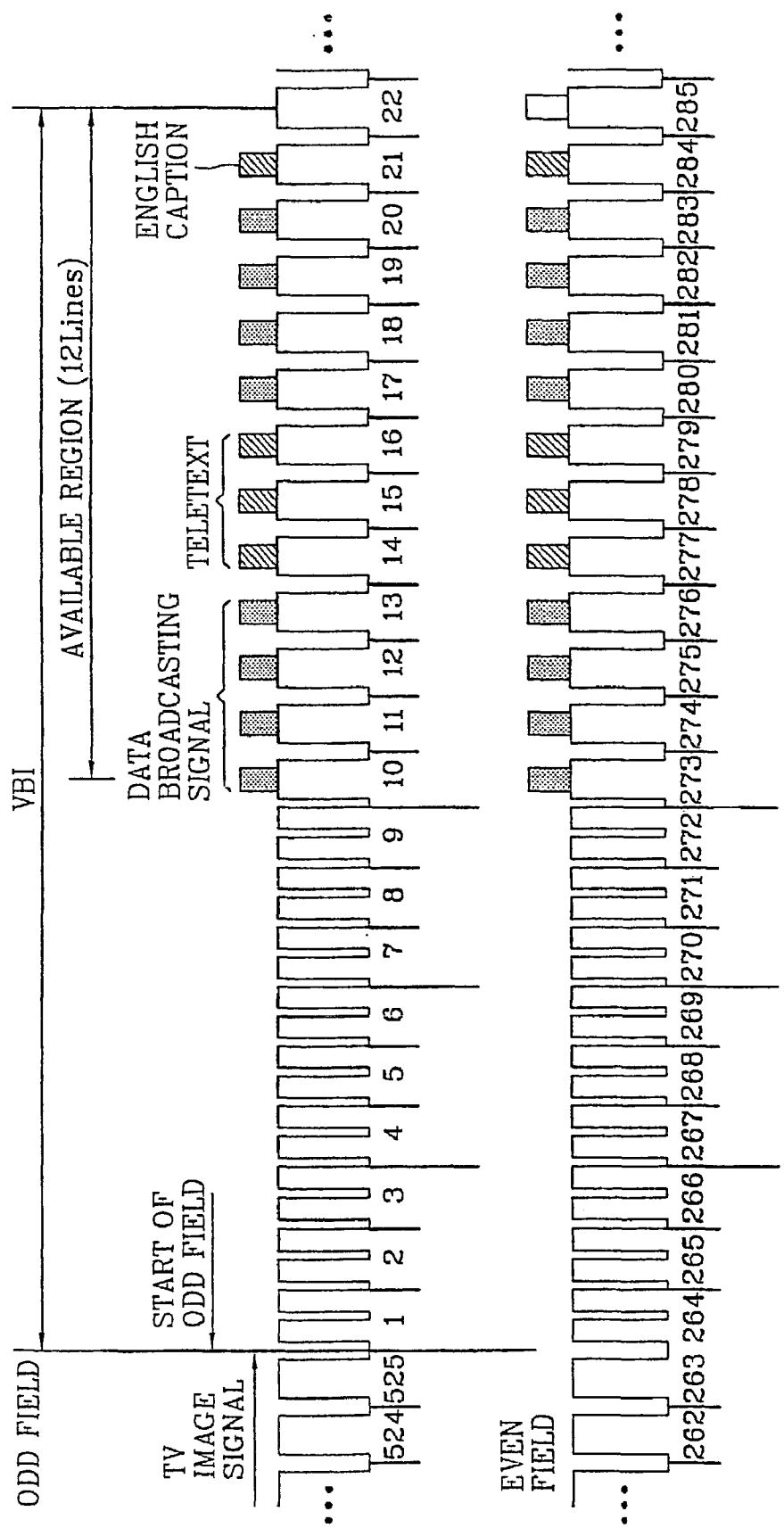

The extraction unit 30 extracts a teletext information (for example, positioned in horizontal scanning lines 14H-16H in case of an odd field) existing within the vertical blanking interval of the tuned channel's signal as shown in FIG. 4. The teletext information is inputted to the extraction unit 30 at a predetermined interval after the vertical synchronization pulse is detected.

The extracted teletext information is transmitted to the interpreter 4 to be sequentially compared with the key word stored in the internal memory of the microprocessor 52 so that the designated key word is searched in a step S35.

Upon comparison, if it is confirmed that the extracted data includes the key word in a step S36, the microprocessor 52 judges that an information corresponding to the designated key word is being received and outputs a message, that is, for example, 'a stock information has been received', for displaying on the display screen unit 22 through the output unit 21 in a step S37.

Simultaneously, the microprocessor 52 stores the received data in a corresponding file (i.e., stock.doc) generated in the memory 51 in a step S39. In addition, if data including another key word is searched besides the already searched key words the microprocessor 52 stores it in another file produced according to the key words in the steps S35-S38.

In case that the searching times are differently designated according to each designated key word, when the current time reaches a designated searching time, the microprocessor searches the key word from the received data and stores the corresponding data in the steps S33-S38.

The above-described method for automatically searching additional data wirelessly received from the TV broadcasting station and storing it can be also applied for searching additional data transmitted by an analog TV broadcasting station, a digital broadcasting satellite (DBS) or via cable TV.

As so far described, according to the method for automatically searching information of the present invention, when the content of the Internet site is updated, it is automatically searched to be stored, which fact is displayed on a screen for the user's information, so that the user can easily be aware that the information has been updated without having to manually connecting to the Internet sites one by one, saving inconvenience. Also, the occasionally updated information is confirmed without missing as it is changed. In addition, besides the information of the Internet site, only that information (including specific key words) desired by the user among additional broadcasting service data provided by broadcasters through the DBS, digital (or analog) TV, or cable TV is automatically searched, and it is stored as classified, thereby enhancing and enriching the searching environment.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for updating data comprising:
receiving, at a device, an address associated with an Internet site from a broadcast signal;
connecting from the device to a server using said address;
extracting a time point corresponding to data associated with the Internet site from the server;
determining whether the Internet site was previously identified by determining whether data associated with the previously identified Internet site and a first time point corresponding to the data associated with the previously identified Internet site were previously stored in a memory of the device;
if the Internet site was not previously identified:
    storing the received address and the extracted time point corresponding to data associated with the Internet site in the memory of the device, and
if the Internet site was previously identified:
    comparing previously stored time point corresponding to the data associated with the received address of the Internet site from the memory of the device to the extracted time point;
    receiving the data associated with the Internet site from the server if the previously stored time point is different from the extracted time point;
    automatically updating the previously stored data associated with the Internet site based on the received data; and
    informing that the previously stored data was updated.

2. The method according to claim 1 further comprising:
displaying the updated data.

3. The method according to claim 1 further comprising:
periodically receiving, from the server, data associated with the Internet site, wherein the periodically received data corresponds with a present time point, comparing the present time point to a time point corresponding to previously stored data associated with the Internet site, automatically updating the previously stored data if the present time point is different than the time point corresponding to the previously stored data, and displaying the updated data.

4. The method according to claim 1 further comprising:
generating a message indicating that the previously stored data has been updated; and
displaying the message.

5. A method for updating data comprising:
searching data associated with a plurality of Internet sites based on a keyword, wherein the keyword is extracted from a broadcast signal;
identifying an Internet site containing data related to the keyword, wherein a second time point corresponds with the data contained in the identified Internet site;
determining whether the Internet site was previously identified by determining whether data associated with the previously identified Internet site and a first time point corresponding to the data associated with the previously identified Internet site were previously stored in memory;
if the Internet site was not previously identified:
    storing a received address and an extracted time point corresponding to data associated with the Internet site in memory, and
if the Internet site was previously identified:
    comparing the first time point and the second time point;
    automatically updating the previously stored data using the data that corresponds with the second time point when the second time point is different than the first time point; and
    informing that the previously stored data was updated.

6. The method according to claim 5, wherein the data related to the keyword includes one or more of news, weather forecast information, television program guide information, sports and stock information.

7. The method according to claim 5 further comprising:
generating a message indicating that the stored data has been updated; and
displaying the message.

8. The method according to claim 5 further comprising:
periodically searching data associated with a plurality of Internet sites based on the keyword.

9. The method according to claim 5, wherein outputting the updated data includes displaying the updated data.

10. The method of claim 5, wherein determining whether the Internet site was previously identified and whether data associated with the Internet site was previously stored in memory comprises:
comparing a network address associated with the Internet site to one or more addresses stored in memory.

11. The method of claim 5, wherein the method further comprises:
storing a network address associated with the Internet site in memory, storing the first time point in memory and storing the data associated with the Internet site, and corresponding to the first time point, in memory if is determined that the Internet site was not previously identified.

12. The method of claim 11, wherein determining whether the Internet site has been previously identified comprises:
comparing the network address associated with the Internet site to one or more addresses stored in memory.

13. The method of claim 5 further comprising:
periodically searching data associated with a plurality of Internet sites based on the keyword, identifying an Internet site containing data related to the keyword, wherein the data is associated with a present time point;
determining whether the Internet site was previously identified and whether data associated with the previously identified Internet site and whether a previous time point corresponding to the data associated with the previously identified Internet site were previously stored in memory;
comparing the present time point and the previous time point if it is determined that the Internet site was previously identified and that data associated with the Internet site was previously stored; and
automatically updating the previously stored data using the data corresponding with the present time point when the present time point is different than the previous time point.

14. An apparatus for updating data comprising:
a user input unit configured to receive an address associated with an Internet site from a broadcast signal;
a server connection unit configured to connect with a server based on the address;
a memory; and
a microprocessor in operational communication with the memory, the microprocessor configured to:
extract a time point corresponding to data associated with the Internet site,
determine whether the Internet site was previously identified by determining whether data associated with the previously identified Internet site and a first time point corresponding to the data associated with the previously identified Internet site were previously stored in the memory of the apparatus;
if the Internet site was not previously identified:
store the received address and the extracted time point corresponding to the data associated with the Internet site in the memory, and
if the Internet site was previously identified:
compare a previously stored time point corresponding to the data associated with the Internet site and the extracted time point,
receive the data associated with the Internet site from the server,
automatically update previously stored data associated with the Internet site based on the received data, and
inform that the previously stored data was updated.

15. The apparatus according to claim 14 further comprising:
a display device configured to display the updated data.

16. The apparatus according to claim 14, wherein the server connection unit and microprocessor together are further configured to periodically connect with the network server based on the address and to receive and store data from the server, wherein the periodically received data corresponds to a present time point; to compare the present time point to a prior time point corresponding to data previously received and stored from the server; and configured to automatically update the previously stored data using the periodically received data if the present time point is different than prior time point.

17. The apparatus according to claim 14, wherein the microprocessor is further configured to generate a message indicating that the previously stored data has been updated, and wherein the display device is further configured to display the message.

18. An apparatus for updating data comprising:
a memory;
a microprocessor in operational communication with the memory, the microprocessor configured to:
search data associated with a plurality of Internet sites based on a keyword, wherein the keyword is extracted from a broadcast signal,
identify an Internet site containing data related to the keyword, wherein the data corresponds with a second time point,
determine whether the Internet site was previously identified and whether data associated with the Internet site and corresponding with a first time point were previously stored in the memory,
if the Internet site was not previously identified and the data associated with the Internet site and corresponding with the first time point was not stored in the memory:
store a received address and an extracted time point corresponding to data associated with the Internet site in the memory, and
if the Internet site was previously identified and the data associated with the Internet site and corresponding with the first time point was stored in the memory:
compare the first time point and the second time point,
automatically update the previously stored data using the data corresponding with the second time point when the second time point is different than the first time point, and
inform that the previously stored data was updated; and
an output unit configured to output the updated data.

19. The apparatus according to claim 18, wherein the data related to the keyword includes one or more of news, weather forecast information, television program guide information, sports and stock information.

20. The apparatus according to claim 18, wherein the microprocessor is further configured to generate a message indicating the stored data has been updated, and wherein the output unit includes a display configured to display the message.

21. The apparatus according to claim 18, wherein the microprocessor is further configured to periodically search data associated with a plurality of Internet sites based on the keyword.

22. The apparatus according to claim 18, wherein the output unit includes a display configured to display the updated data.

23. The apparatus of claim 18, wherein the microprocessor is further configured to compare a network address associated with the Internet site to one or more addresses stored in memory.

24. The apparatus of claim 18 further comprises:
a memory for storing a network address associated with the Internet site in memory, storing the second time point in memory, and storing the data associated with the Internet site and corresponding to the second time point in memory if is determined that the Internet site was not previously identified.

25. The apparatus of claim 24, wherein the microprocessor is further configured to compare the network address associated with the Internet site to one or more addresses stored in memory.

26. The apparatus of claim 18, wherein the microprocessor is further configured to periodically search data associated with a plurality of Internet sites based on a keyword, to identify an Internet site containing data related to the keyword, wherein the data is associated with a present time point; to determine whether the Internet site was previously identified and whether data associated with the Internet site and corresponding to a prior time point were previously stored in memory; to compare the present time point and the prior time point if it is determined that the Internet site was previously identified and data associated with the Internet site was previously stored; and automatically update the previously stored data using the data associated with the present time point when the present time point is different than the prior time point.

* * * * *